(12) United States Patent
Carbaugh et al.

(10) Patent No.: US 8,282,450 B2
(45) Date of Patent: *Oct. 9, 2012

(54) COOLING TOOL

(75) Inventors: John H. Carbaugh, Polo, IL (US); Oral Wayne Johnson, Rockford, IL (US)

(73) Assignee: John H. Carbaugh, Polo, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/360,955

(22) Filed: Jan. 30, 2012

(65) Prior Publication Data

US 2012/0129437 A1    May 24, 2012

Related U.S. Application Data

(63) Continuation of application No. 12/727,070, filed on Mar. 18, 2010, now Pat. No. 8,113,927.

(60) Provisional application No. 61/161,273, filed on Mar. 18, 2009.

(51) Int. Cl.
*A22B 5/06* (2006.01)

(52) U.S. Cl. ........................................................ 452/197

(58) Field of Classification Search .......... 452/174–176, 452/185, 188–192, 197; 294/81.1, 81.2, 294/81.21, 81.3, 67.4, 74, 81.5, 81.56, 82.1, 294/81.54
See application file for complete search history.

(56) References Cited

U.S. PATENT DOCUMENTS

| | | | |
|---|---|---|---|
| 85,134 A | 12/1868 | Rusco | |
| 521,774 A | 6/1894 | Perl | |
| 1,020,843 A | 3/1912 | Petersen | |
| 1,030,683 A | 6/1912 | Roskopf | |
| 1,148,393 A | 7/1915 | McGrath | |
| 1,603,913 A | 10/1926 | Gillitzer | |
| 2,710,766 A | 6/1955 | Erlewine | |
| 4,425,678 A | 1/1984 | Pepper | |
| 4,580,317 A | 4/1986 | Timothy | |
| 4,763,942 A | 8/1988 | Lyon | |
| 5,145,224 A | 9/1992 | Welk | |
| 5,263,675 A | 11/1993 | Roberts et al. | |
| 5,591,077 A | 1/1997 | Rowe | |
| 5,938,521 A | 8/1999 | Jasek et al. | |
| 6,132,305 A | 10/2000 | Witherell | |
| 6,186,882 B1 | 2/2001 | Adams et al. | |
| 6,296,288 B1 | 10/2001 | Khachaturian | |
| 7,387,567 B1 * | 6/2008 | Bailey | 452/197 |
| 7,588,490 B1 * | 9/2009 | Warner et al. | 452/197 |
| 7,922,568 B1 * | 4/2011 | Byrd | 452/197 |
| 2004/0157542 A1 | 8/2004 | Bloch | |

* cited by examiner

*Primary Examiner* — Richard Price, Jr.
(74) *Attorney, Agent, or Firm* — Banner & Witcoff, Ltd.

(57) ABSTRACT

A tool has a first member cooperatively associated with a second member. The first member has a first gripper integral at an end thereof The first member has an internal longitudinal groove in communication with a plurality of internal spaced locking grooves. The second member has a second gripper attached at a first end. The second member has a projection at a second end. The projection of the second member is received by the longitudinal groove. The second member is moveable with respect to the first member between a fully contracted position and a plurality of extended positions. In one of the plurality of extended positions, the protrusion is selectively received in one of the plurality of locking grooves to lock the members in one of the plurality of extended positions.

20 Claims, 16 Drawing Sheets

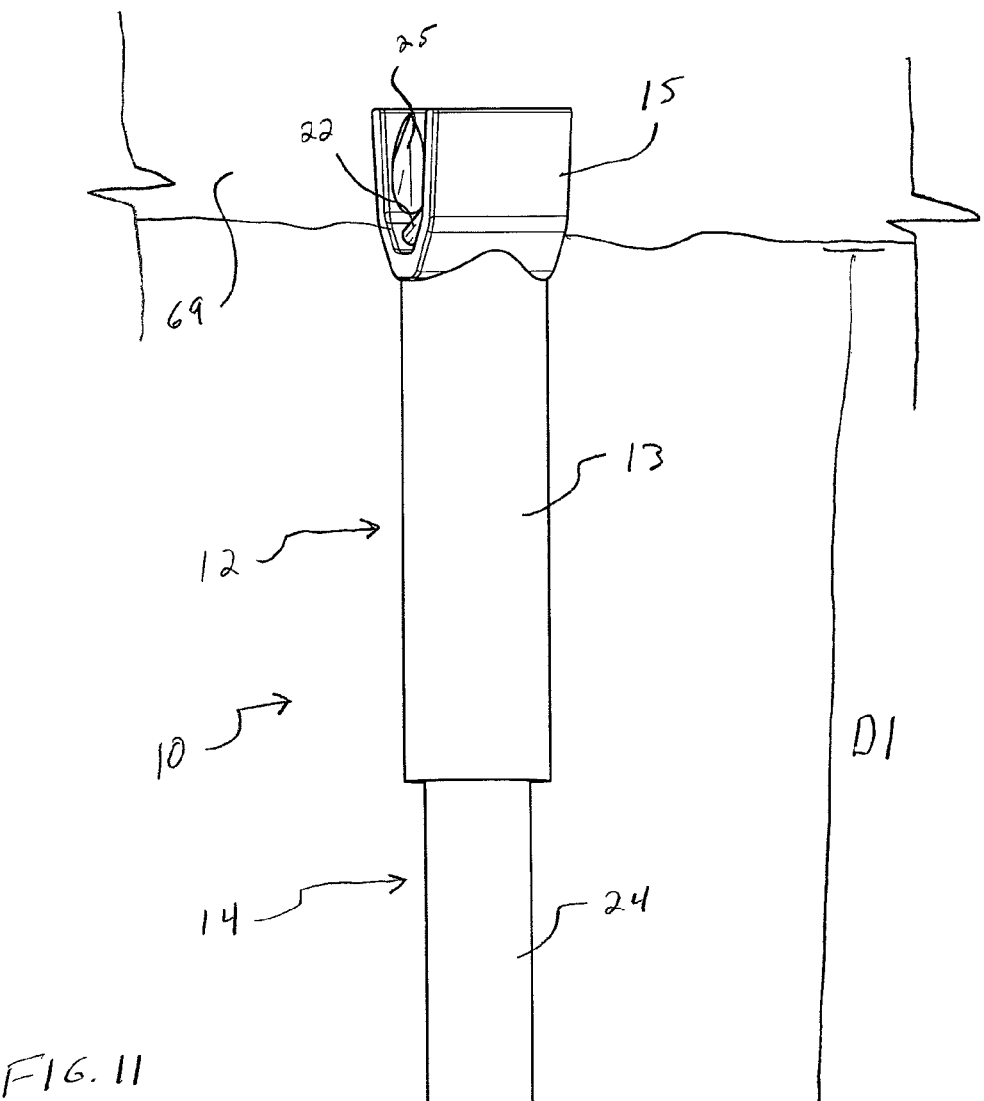
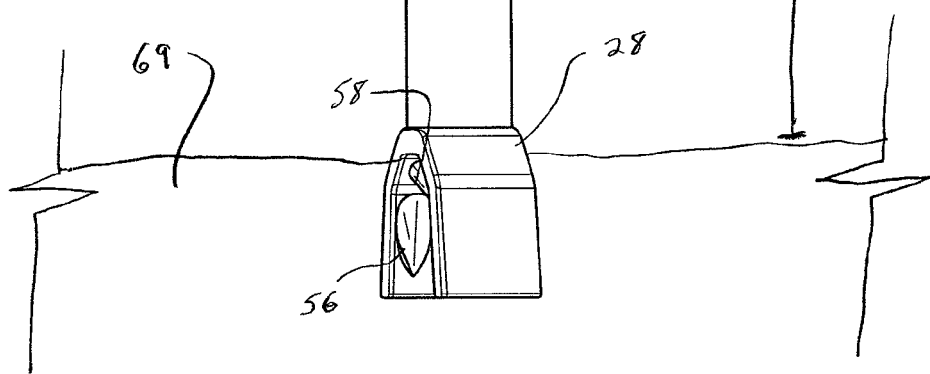
FIG. 11

COOLING TOOL

CROSS-REFERENCE TO RELATED APPLICATIONS

The present application claims priority to and the benefit of U.S. utility application Ser. No. 12/727,070, filed Mar. 18, 2010 which application claims priority to U.S. Provisional Application No. 61/161,273, filed on Mar. 18, 2009. Both applications are incorporated herein by reference in their entirety and made a part hereof.

TECHNICAL FIELD

The invention relates to tools used by hunters, and more specifically, to a tool used by hunters in the field for cooling and harvesting a carcass prior to transport for further processing.

BACKGROUND

Tools used to harvest animals are known. While such tools according to the prior art have advantageous features, they nevertheless have certain limitations. The present invention is provided to overcome some of these limitations, and to supply further advantages not previously presented.

BRIEF SUMMARY

Aspects of the invention relate to a tool that includes first and second elongated cylindrical members. The first elongated cylindrical member has a first gripper attached to an end thereof, with the first member having an internal chamber extending therethrough. A longitudinal groove is located on an internal surface of the chamber, and at least one locking groove is positioned in communication with the longitudinal groove and extending transverse to the longitudinal groove on the internal surface of the chamber. The second elongated cylindrical member has a second gripper attached to an end thereof, and a second end configured to be inserted into the internal chamber of the first member. The second member further has a projection located proximate the second end. When the second end of the second member is inserted into the internal chamber of the first member, the projection of the second member is received by the longitudinal groove such that the second member is moveable axially with respect to the first member and the projection slides within the longitudinal groove. The second member is lockable in at least one extended locking position relative to the first member, including at least a first position. The projection is received in a first locking groove and the first gripper is spaced a first distance from the second gripper in the first position. The second member is further moveable to a fully contracted position, where the first gripper is spaced a second distance from the second gripper in the fully contracted position, the second distance being less than the first distance.

According to one aspect, the first member further includes a plurality of locking grooves comprising at least a first locking groove and a second locking groove being spaced different distances from the first gripper, and the second member is lockable in a plurality of locking positions relative to the first member, including at least a first position and a second position. The projection is received in the first locking groove and the first gripper is spaced a first distance from the second gripper in the first position, and the projection is received in the second locking groove and the first gripper is spaced a second distance from the second gripper in the second position.

According to another aspect, the plurality of locking grooves further includes a third locking groove and a fourth locking groove in communication with the longitudinal groove and extending transverse to the longitudinal groove on the internal surface of the chamber. The first, second, third, and fourth locking grooves are arranged successively along an edge of the longitudinal groove and are all spaced different distances from the first gripper. The second member is further lockable in at least a third position and a fourth position relative to the first member. The projection is received in the third locking groove and the first gripper is spaced a third distance from the second gripper in the third position, and the projection is received in the fourth locking groove and the first gripper is spaced a fourth distance from the second gripper in the fourth position.

According to a further aspect, the first member further includes a second longitudinal groove located on the internal surface of the chamber, opposite the longitudinal groove, and a second plurality of locking grooves in communication with the second longitudinal groove and extending transverse to the second longitudinal groove on the internal surface of the chamber. The second member further has a second projection located proximate the second end. When the second end of the second member is inserted into the internal chamber of the first member, the second projection of the second member is received by the second longitudinal groove. Additionally, the second projection is received in a first of the second plurality of locking grooves in the first position, and the second projection is received in a second of the second plurality of locking grooves in the second position.

According to yet another aspect, the first member is formed of a first partial cylindrical piece and a second partial cylindrical piece joined to each other along a juncture line to form the first member, and the second member is formed of a third partial cylindrical piece and a fourth partial cylindrical piece joined to each other along a juncture line to form the second member. In one embodiment, each of the first and second pieces have a partial grip piece integrally connected at an end thereof, and the partial grip pieces combine to form the first gripper, such that the first gripper is integrally formed with the first member. Additionally, each of the third and fourth pieces have a notch at an end thereof, such that the notches combine to form a receiver, and a portion of the second gripper is received in the receiver to connect the second gripper to the second member, such that the second gripper is rotatable with respect to the second member.

According to still further aspects, the at least one locking groove is formed in a generally L-shaped configuration including a first segment extending transversely from the longitudinal groove and a second segment extending transversely from the first segment. The projection is received in the second segment of the first locking groove in the first position.

According to additional aspects, the internal chamber of the first member has a first opening at the end of the first member having the first gripper thereon and a second opening in a second end opposite the first end. The second end of the second member is inserted into the second opening in the first position and the second position, and the second end of the second member is further configured to be inserted into the first opening to place the tool in a carrying position.

Additional aspects of the invention relate to a tool that includes a first member and a second member. The first member includes a first elongated cylindrical body, a first gripper attached to an end of the first cylindrical body, and an elongated internal chamber extending through the first cylindrical body. The first gripper is integrally formed with the first cylindrical body, and the first gripper also has a generally U-shaped configuration with two extending arms spaced from each other. The second member includes a second elongated cylindrical body having a first end having a receiver and a second end, and a second gripper attached to the first end of the second cylindrical body. The second gripper has an extension received in the receiver to connect the second gripper to the second cylindrical body, such that the second gripper is rotatable with respect to the second cylindrical body. The second gripper also has a generally U-shaped configuration with two extending arms spaced from each other. The second end of the second member is configured to be inserted into the internal chamber of the first member, such that the second member is moveable axially with respect to the first member within the internal chamber. The first and second members have complementary locking structures such that second member is lockable in a plurality of different extension positions within the internal chamber, where the first gripper and the second gripper are spaced different distances from each other in the plurality of extension positions.

According to one aspect, the first member is formed of a first partial cylindrical piece and a second partial cylindrical piece joined to each other along a juncture line to form the first cylindrical body, each of the first and second pieces having a partial grip piece integrally connected at an end thereof The partial grip pieces combine to form the first gripper integrally formed with the first cylindrical body.

According to another aspect, the first and second partial cylindrical pieces together have a plurality of complementary protrusions and holes, and the protrusions are received within the holes to connect the first piece to the second piece.

According to a further aspect, the second member is formed of a first partial cylindrical piece and a second partial cylindrical piece joined to each other along a juncture line to form the second cylindrical body, and each of the first and second pieces have a notch at an end thereof, wherein the notches combine to form the receiver.

According to yet another aspect, the first and second partial cylindrical pieces together have a plurality of complementary protrusions and holes, and the protrusions are received within the holes to connect the first piece to the second piece.

According to a still further aspect, the receiver has an engagement surface and the extension of the second member has a flange that engages the engagement surface to retain the extension within the receiver.

According to additional aspects, the extension of the second member includes a pair of flexible tabs and the receiver has a narrowed opening. When the extension is inserted into the receiver, the tabs flex inwardly to fit into the narrowed opening and expand outwardly to retain the extension within the receiver after passing the narrowed opening.

According to other aspects, the first and second grippers each have protrusions thereon to assist in gripping an object.

Further aspects of the invention relate to a tool that includes a first member and a second member. The first member includes a first elongated cylindrical body, a first gripper attached to an end of the first cylindrical body and integrally formed with the first cylindrical body, an elongated internal chamber extending through the first cylindrical body, a longitudinal groove located on an internal surface of the internal chamber, and a plurality of locking grooves in communication with the longitudinal groove. The plurality of locking grooves include at least a first locking groove and a second locking groove spaced different distances from the first gripper, where the first and second locking grooves are each formed in a generally L-shaped configuration including a first segment extending transversely from the longitudinal groove and a second segment extending transversely from the first segment. The second member includes a second elongated cylindrical body having a first end having a receiver and a second end configured to be inserted into the internal chamber of the first member, and a second gripper attached to the first end of the second cylindrical body. The second gripper has an extension received in the receiver to connect the second gripper to the second cylindrical body, such that the second gripper is rotatable with respect to the second cylindrical body, the second member further having a projection located proximate the second end. The first and second grippers are each formed in a generally U-shaped configuration with two extending arms spaced from each other. Additionally, when the second end of the second member is inserted into the internal chamber of the first member, the projection of the second member is received by the longitudinal groove such that the second member is moveable axially with respect to the first member and the projection slides within the longitudinal groove. The second member is lockable in a plurality of locking positions relative to the first member, including at least a first position and a second position. The projection is received in the second segment of the first locking groove and the first gripper is spaced a first distance from the second gripper in the first position, and the projection is received in the second segment of the second locking groove and the first gripper is spaced a second distance from the second gripper in the second position.

According to one aspect, the first member is formed of a first partial cylindrical piece and a second partial cylindrical piece joined to each other along a juncture line to form the first cylindrical body, each of the first and second pieces having a partial grip piece integrally connected at an end thereof The partial grip pieces combine to form the first gripper integrally formed with the first cylindrical body. The second member is formed of a third partial cylindrical piece and a fourth partial cylindrical piece joined to each other along a juncture line to form the second cylindrical body. Each of the third and fourth pieces have a notch at an end thereof, such that the notches combine to form the receiver.

According to another aspect, the first and second partial cylindrical pieces together have a plurality of complementary protrusions and holes, and the protrusions are received within the holes to connect the first piece to the second piece. The third and fourth partial cylindrical pieces together also have a plurality of complementary protrusions and holes, and the protrusions are received within the holes to connect the third piece to the fourth piece.

According to a further aspect, the first member further includes a second longitudinal groove located on the internal surface of the chamber, opposite the longitudinal groove, and a second plurality of locking grooves in communication with the second longitudinal groove and extending transverse to the second longitudinal groove on the internal surface of the chamber. The second member further has a second projection located proximate the second end. When the second end of the second member is inserted into the internal chamber of the first member, the second projection of the second member is received by the second longitudinal groove, wherein the second projection is received in a first of the second plurality of locking grooves in the first position, and the second projection is received in a second of the second plurality of locking grooves in the second position.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings, which may not necessarily be drawn to scale, in which:

FIG. 11 is a perspective view of the tool of FIG. 1 in a first locked position, in use to grip an object;

DETAILED DESCRIPTION

Figure 1:
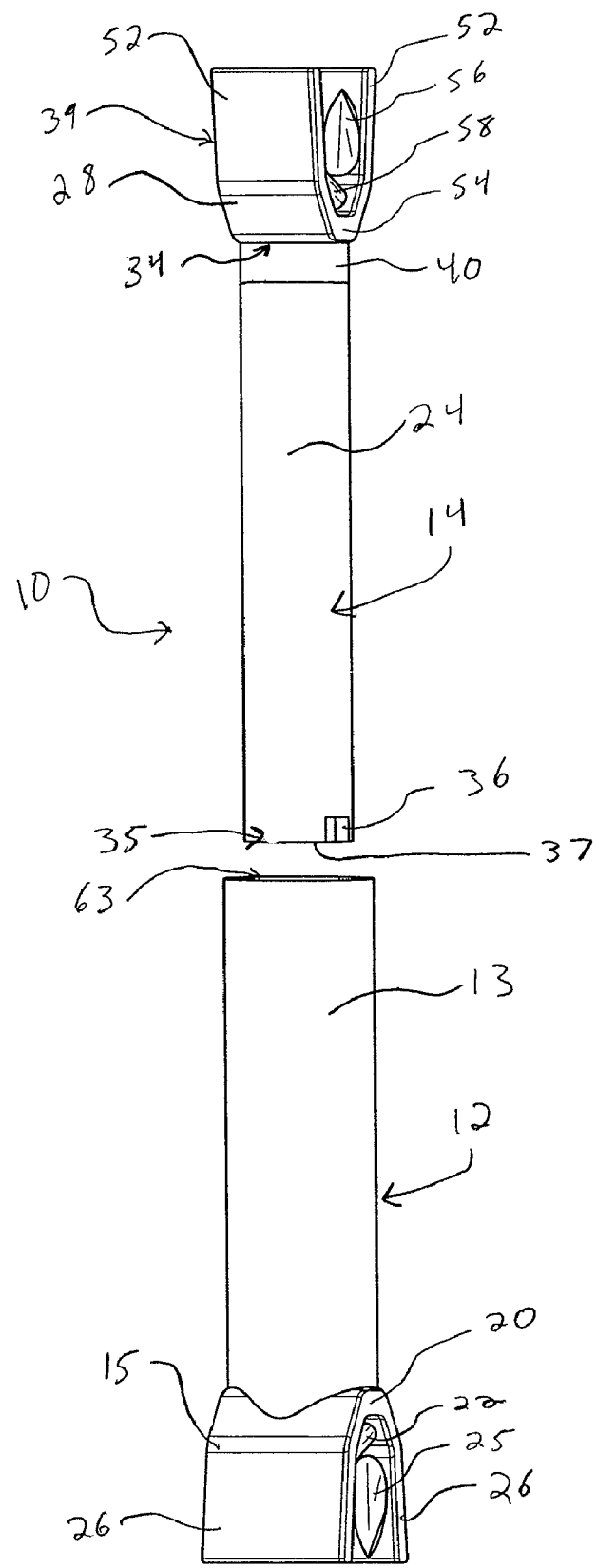
FIG. 1 is a perspective view of one example embodiment of a tool according to the present invention.
Figure 2:
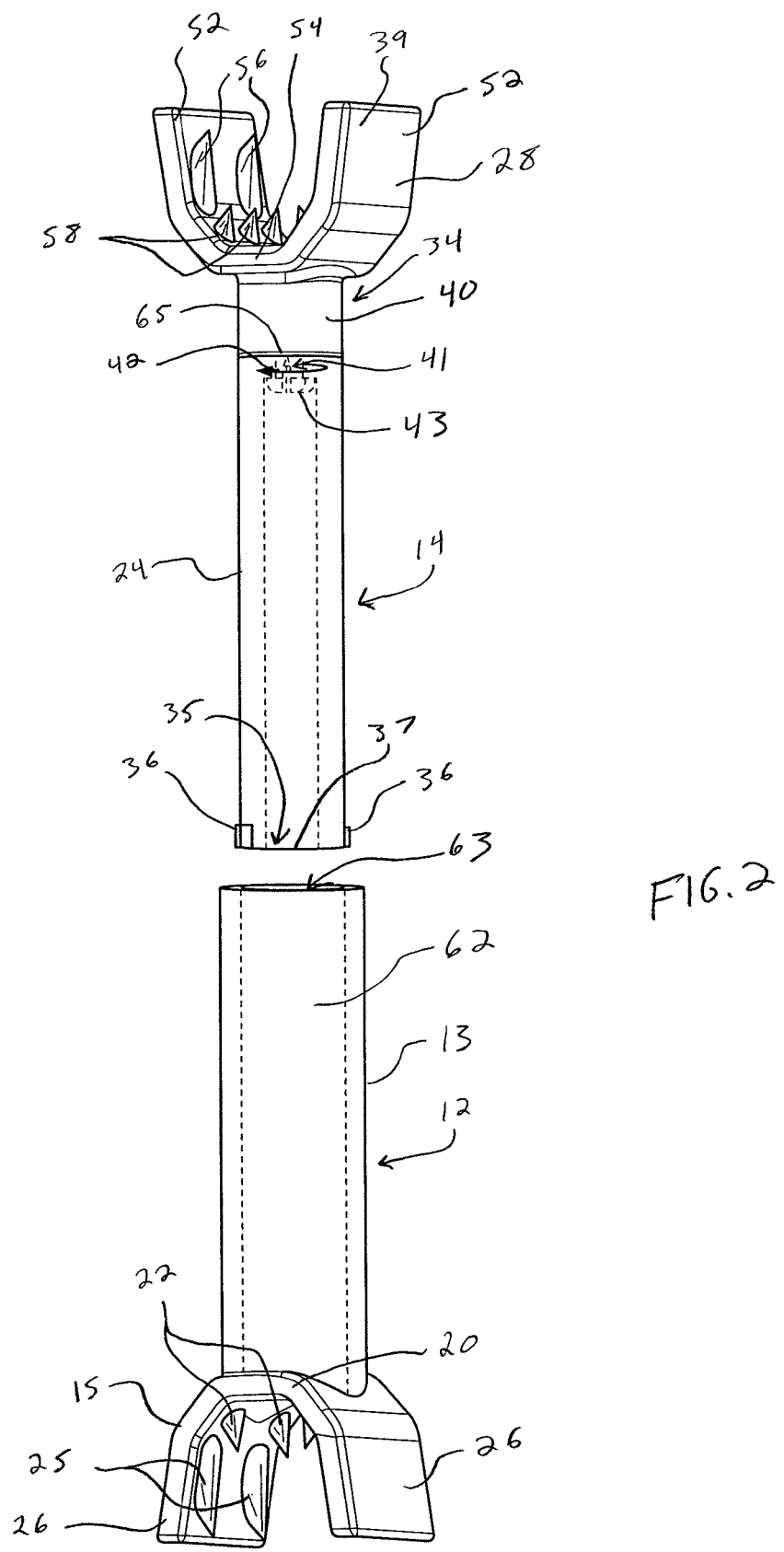
FIG. 2 is another perspective view of the tool of FIG. 1, with a portion in transparent view illustrated by broken lines.

While this invention is susceptible of embodiments in many different forms, exemplary embodiments of the invention are shown in the drawings and will herein be described in detail with the understanding that the present disclosure is to be considered as an exemplification of the principles of the invention and is not intended to limit the broad aspect of the invention to the embodiments illustrated.

Referring now to FIG. 1, there is shown an embodiment of a cooling tool or hunter field tool, generally designated by the reference numeral 10. The tool 10 can be used by hunters in the field to cool and harvest a carcass, such as a deer, prior to transporting the carcass for further processing. The tool 10 generally includes a first member 12 and a second member 14. As described in greater detail below, the members 12, 14 are cooperatively associated with one another such that the second member 14 is lockable in a plurality of positions with respect to the first member 12. The structure of the tool 10 will first be described below, followed by a description of the operation of the tool 10.

Figure 3:
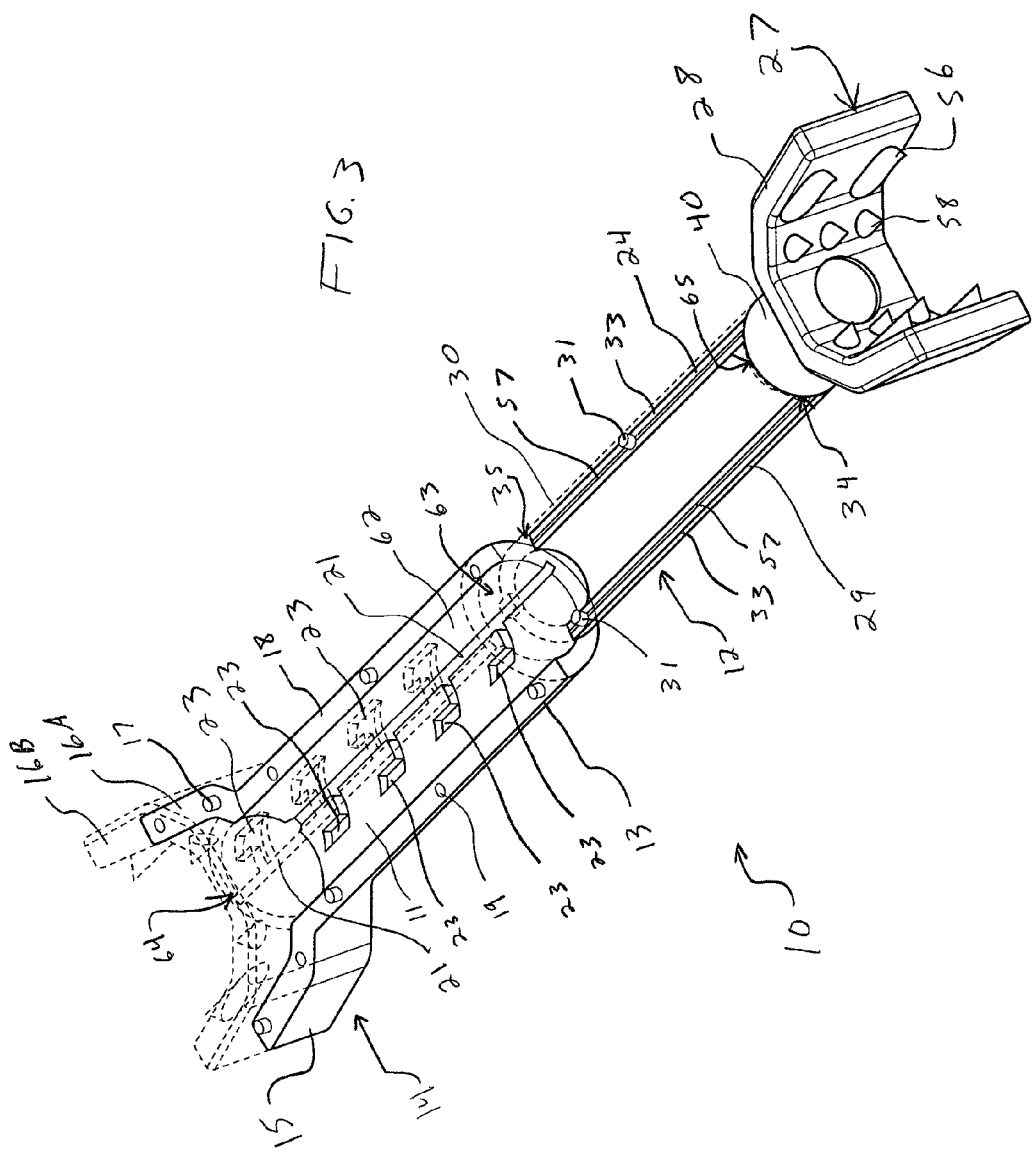
FIG. 3 is another perspective view of the tool of FIG. 1, with a portion in transparent view illustrated by broken lines.
Figure 4:
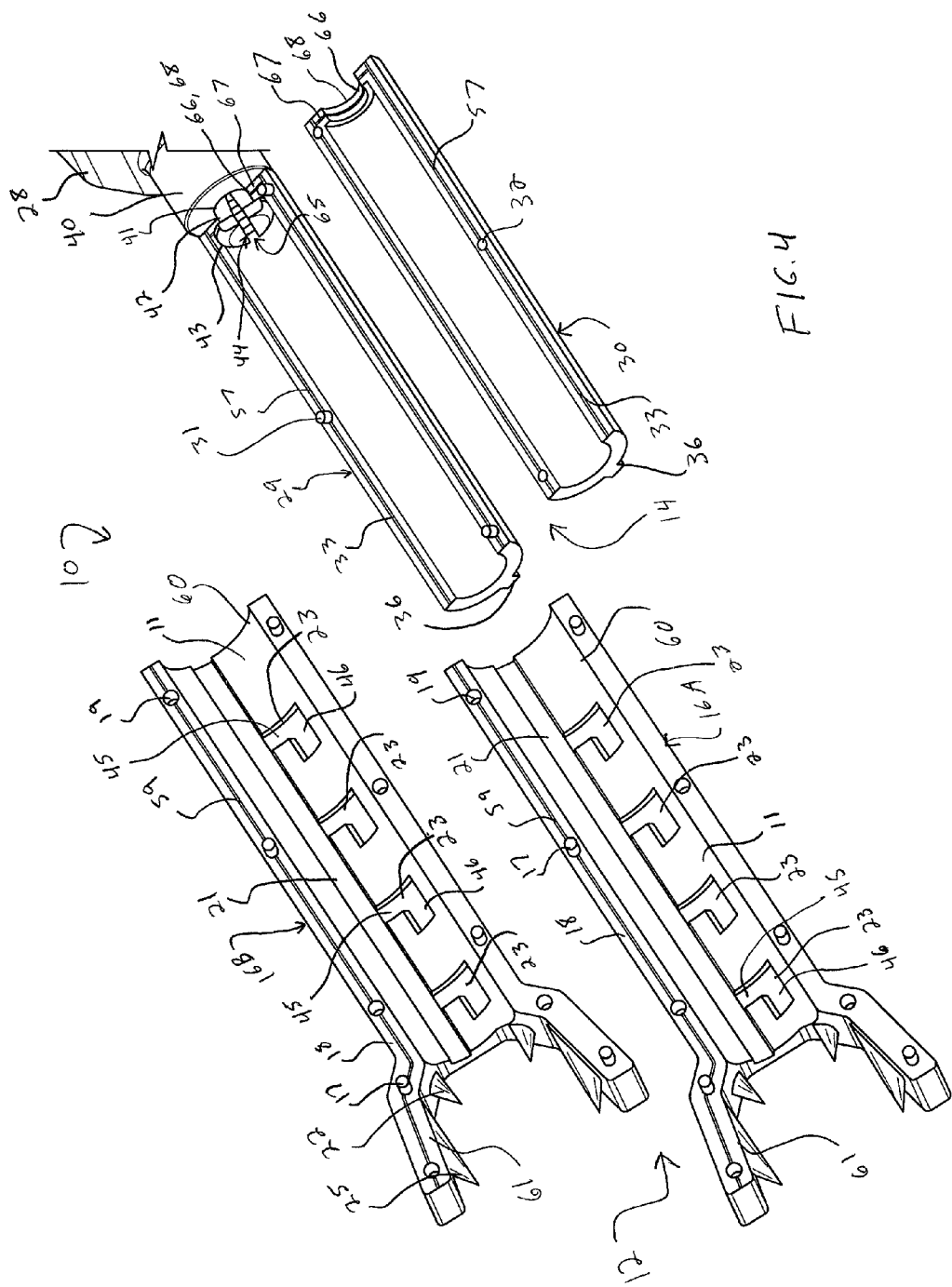
FIG. 4 is an exploded view of the tool of FIG. 1.
Figure 5:
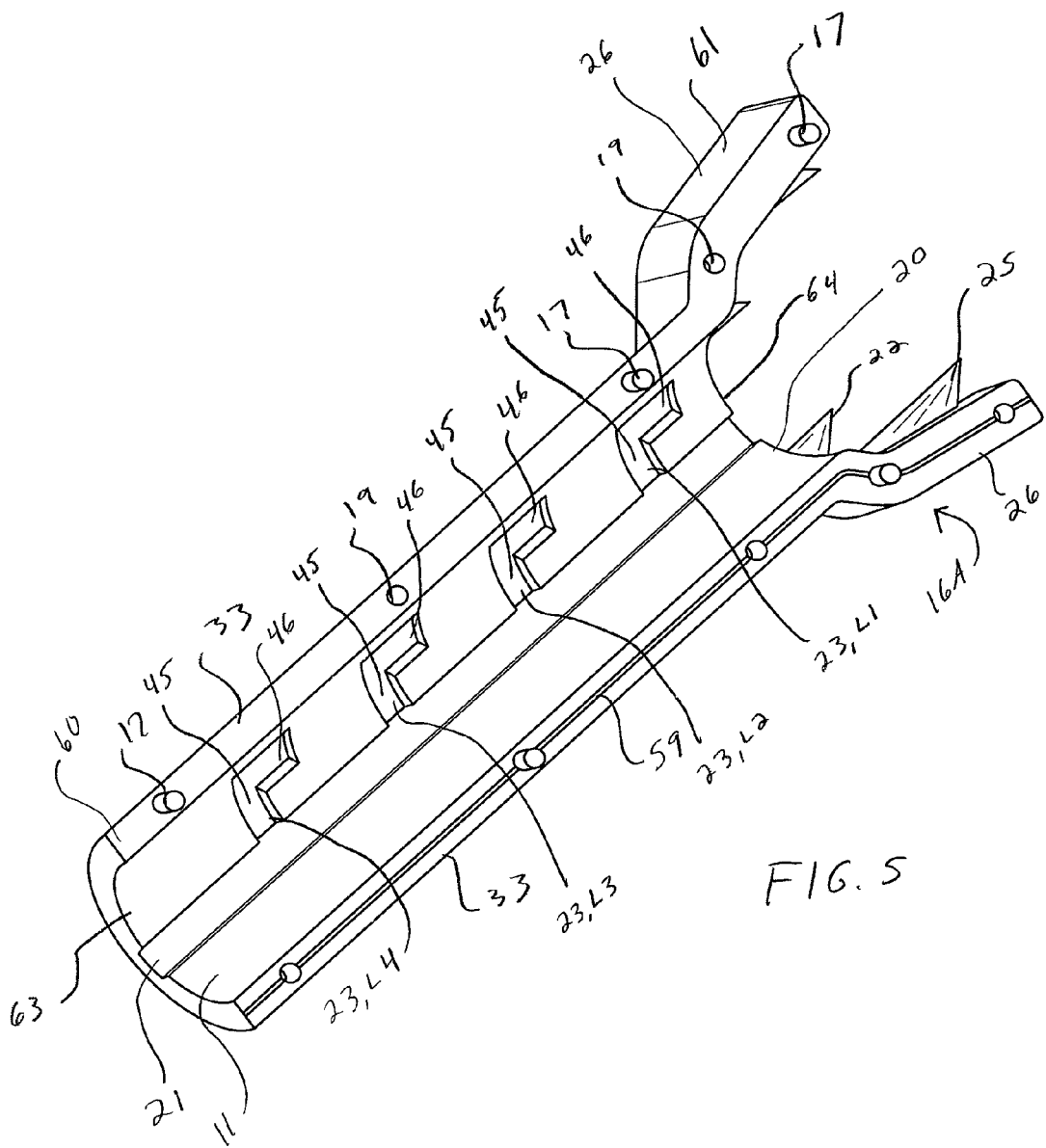
FIG. 5 is a perspective view of a first piece of a first member of the tool of FIG. 1.

As shown in FIG. 1, the first member 12 has a first cylindrical body or part 13 and an integral first gripper 15 connected at an end of the body 13. In the embodiment shown, the first gripper 15 is integrally formed with and integrally connected to the first cylindrical body 13. However, in another embodiment, the first gripper 15 may be formed as a separate piece from the body 13, and may be connected to the body 13 in another manner. Additionally, in this embodiment, the first member 12 is formed of two pieces 16A, 16B. FIGS. 3-5 illustrate the first piece 16A of the first member 12, which has a plurality of projections in the form of pins 17 alternating with holes 19 spaced along the interior edges 18. The second piece 16B, also shown in FIGS. 3-4, has corresponding pins 17 and pin-sized holes 19 along the interior edges 18, with the holes 19 being dimensioned to fit the pins 17 to fit in an abutting press-fit or snap-fit position with the first piece 16A to form the first member 12. The first and second pieces 16A-B in this embodiment also have ridges 59 on the interior edges 18. These ridges 59 provide material for sonic welding, so the pieces 16A-B can be sonically welded together after connection, to further secure the pieces 16A-B together. It is understood that additional joining techniques can be used to further secure this connection, such as other types of welding, adhesives, complementary linking or snapping structures, or fasteners, such as bolts, nuts, and lock washers, etc. It is also understood that alternate connection techniques an be used in place of the complementary pins 17 and holes 19, including the aforementioned techniques. In this embodiment, as shown in FIG. 4, the first and second pieces 16A-B are substantially identical to each other, each having a partial or semi-cylindrical portion 60 and a partial grip portion 61 integrally formed with the semi-cylindrical portion 60. FIG. 5 illustrates only the first piece 16A. When the two pieces 16A-B are connected together, the semi-cylindrical portions 60 combine to form the cylindrical body 13 and the partial grip portions 61 combine to form the first gripper 15. In another embodiment, the first member 12 may be formed of a single piece, or a larger number of pieces.

As shown in FIGS. 2-5, the first cylindrical body 13 is hollow, with an internal chamber 62 formed therein and defined by the internal wall 11. In this embodiment, the internal chamber 62 has two openings 63, 64 at opposite ends of the first member 12 with two sets of internal grooves along the interior wall 11. As shown in FIGS. 3-5, the first set of internal grooves is a pair of longitudinal grooves 21, one opposite the other (e.g., spaced 180 degrees on the member 12) in parallel, which extend along the length of the internal wall 11 of the first cylindrical body 13. The second set of internal grooves are a plurality of locking grooves 23 (i.e. two or more) in communication with the longitudinal grooves 21. In this embodiment, the locking grooves 23 are L-shaped grooves 23 spaced evenly along each of the longitudinal grooves 21, with each longitudinal groove 21 having four locking grooves 23 connected thereto. The locking grooves 23 are arranged in pairs located on substantially opposite sides of the chamber 62. The locking grooves 23 closest to the first gripper 15 are in a first groove position L1, and the locking grooves 23 closest to the opposite end of the first cylindrical body 13 are in a fourth groove position L4, with the locking grooves 23 in between serving consecutively as second and third groove positions L2, L3. The locking grooves 23 have a horizontal portion or segment 45, which is in communication with the corresponding longitudinal groove 21 and extends transversely to the longitudinal groove 21, and a vertical portion or segment 46, which extends from the horizontal portion 45 towards the first gripper 15 and is generally parallel to the longitudinal groove 21. In the embodiment shown, the horizontal segment 45 extends perpendicular to the longitudinal groove 21 and the vertical segment 46 extends perpendicular to the horizontal segment 45. It is understood that a single longitudinal groove 21 and corresponding single set of locking grooves 23 could be used in another embodiment.

The first gripper 15 is shown in FIGS. 1-5 and is integral with the first cylindrical body 13, as described above. As shown in FIGS. 2-5, the first gripper 15 is U-shaped having a bottom side 20 and generally curved upper sides 26. In this embodiment, the first gripper has two types of sharp protrusions along the interior surface of the sides 20, 26. The first type of sharp protrusions 25 is larger and project from the curved internal upper sides 26 of the first gripper 15. The second type of sharp protrusions 22 are smaller than the first type 25 and project from the curved interior bottom side 20 of the first gripper 15. The first gripper 15 also has an opening 64 of the chamber 62 therein, as also described above.

Figure 6:
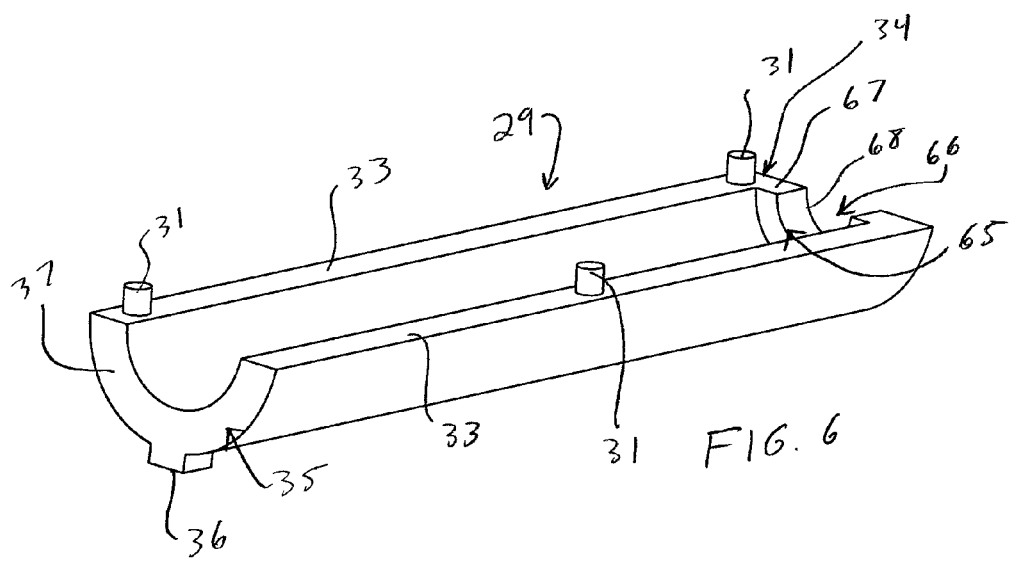
FIG. 6 is a perspective view of a first piece of a portion of a second member of the tool of FIG. 1.
Figure 7:
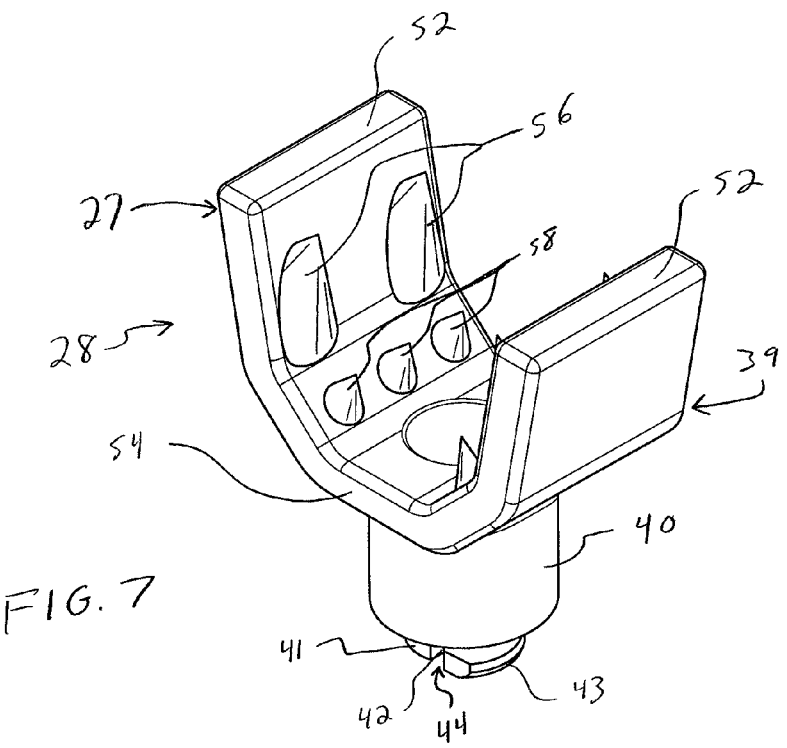
FIG. 7 is a perspective view of a gripper of the second member of the tool of FIG. 1.

As shown in FIGS. 1-4 and 6, the second member 14 has a second cylindrical body 24 at one end and a second gripper 28 connected to the body 24 at the other end. In this embodiment, the second member 14 is comprised of three pieces, with the cylindrical body being formed of two partial or semi-cylindrical pieces 29,30, shown in FIGS. 3, 4, and 6, and the second gripper 28 being formed of a separate, single piece 27, as shown in FIGS. 3, 4, 7, and 8. Additionally, the first and second pieces 29, 30 have complementary protrusions and holes for connection, similarly to the first and second pieces 16A-B of the first cylindrical body 13. FIG. 6 shows the first piece 29 of the second cylindrical body 24, which has protrusions in the form of pins 31 protruding along the internal edges 33. The second piece 30 of the second cylindrical body 24, shown in FIG. 4 along with the first piece 29, has corresponding pin-sized holes 32 along the internal edges 33. The first piece 29 and the second piece 30 fit in an abutting press-fit or snap-fit position to form the second cylindrical body 24 of the second member 14. The first and second pieces 29, 30 in this embodiment also have ridges 57 on the interior edges 33. These ridges 57 provide material for sonic welding, so the pieces 29, 30 can be sonically welded together after connection, as described above. As similarly described above, additional or alternate joining techniques can be used to secure the connection between the pieces 29, 30. In another embodiment, the second member 14 may be formed of a smaller or a larger number of pieces. Further, while the second cylindrical body 24 is hollow in this embodiment, in other embodiments, it may be partially or completely solid.

As shown in FIGS. 2-4 and 6, the second cylindrical body 24 is hollow with a first end 34 for attaching the second gripper 28 and a second end 35 for connecting with the first member 12. The second end 35 has two projections 36 on the external surface of the second member 14 that run along the bottom edge 37 of the second cylindrical body 24. The projections 36 are on opposite sides (generally spaced 180 degrees apart) of the second cylindrical body 24. It is understood that a single projection could be used, such as in an embodiment with a single longitudinal groove 21 and a single set of locking grooves 23 connected thereto, and the projections 36 could take various shapes.

As shown in FIGS. 2, 4, 7, and 8, the second gripper 28 is an attachable piece for attachment to the second cylindrical body 24. The second gripper 28 has a top U-shaped portion 39 and a bottom cylindrical neck portion 40. The U-shaped portion 39 has curved internal upper sides 52 and a bottom side 54. The U-shaped portion 39 of the second gripper 28 has two types of sharp protrusions along the interior surface. The first type of sharp protrusions 56 is larger and projects from the curved internal upper sides 52 of the U-shaped second gripper 39. The second type of sharp protrusions 58 is smaller than the first type and projects from the curved interior bottom sides 54 of the U-shaped portion 39 of the second gripper 28.

As further shown in FIGS. 2, 4, 7, and 8, the second gripper 28 has an extension 41 on the bottom of the cylindrical neck portion 40. The extension 41 is configured to be received in a receiver 65 on the second cylindrical body 24, and serves as a means to attach the second gripper 28 to the second cylindrical body 24 to form the second member 14. The extension 41 is comprised of a resilient tab portion 42 and a flange portion 43, which is split down the middle to create a small gap 44 between the two halves of the extension 41. As a result, the tab portion 42 can be described as a pair of tabs separated by a gap 44, with each tab having a portion of the flange 43 thereon. The small gap 44 allows the two halves of the extension 41 to be squeezed together, and the tabs 42 flex inwardly to insert the extension 41 into the receiver 65 at the first end 34 of the second cylindrical body 24. Once the extension 41 is inserted into the receiver 65, the tabs 42 flex outwardly and the flange portion 43 engages an engagement surface of the receiver to keeps the second gripper 28 connected to the second cylindrical body 24 to form the second member 14. In this embodiment, the receiver 65 is formed by a narrowed opening 66 in an end wall 67 of the second cylindrical body 24, where the opening 66 receives the extension 41 and the inner surface of the end wall 67 forms the engagement surface. Each piece 29, 30 has a partial end wall with a notch 68, so that the pieces 29, 30 combine to form the receiver 41. Attachment of the second gripper 28 by the extension 41 allows the second gripper 28 to be rotated 360 degrees with respect to the second cylindrical body 24. In another embodiment, a smaller degree of rotation may be enabled, or the gripper 28 may not be rotatable.

Figure 8:
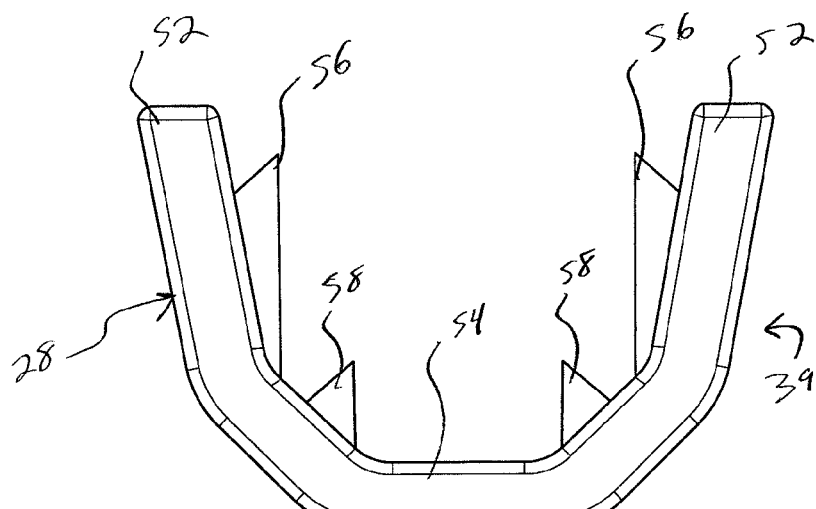
FIG. 8 is a front elevation view of the gripper of FIG. 7.
Figure 8A:
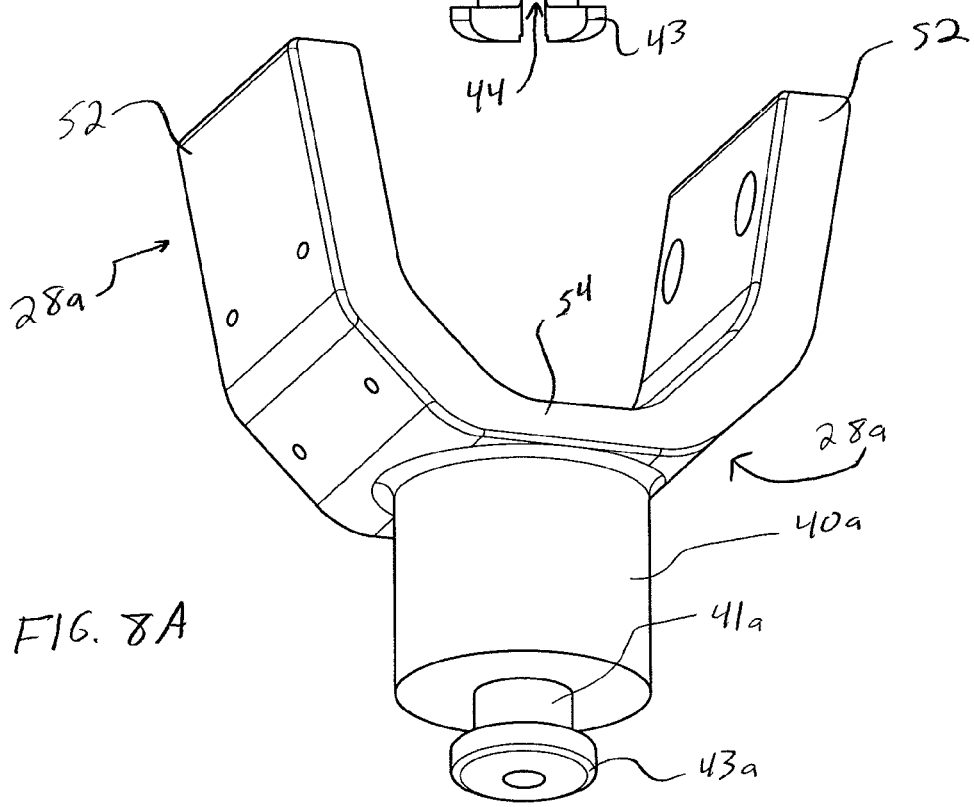
FIG. 8A is a perspective view of an alternate embodiment of a gripper configured for use with the second member of the tool of FIG. 1.

FIG. 8A discloses an alternative embodiment of the second gripper, designated with the reference numeral 28a. It is understood that the alternative second gripper 28a could be used instated of the second gripper 28 of FIG. 8. In this embodiment, the second gripper 28 has some similar structure to the second gripper 28 of FIG. 8, and is configured for connection to the receiver 65 of FIGS. 2-4. However, the second gripper 28a of FIG. 8A has a differently configured extension 41a that extends from a bottom of the cylindrical neck portion 40a. In this embodiment, the extension 41a has a flange 43a at a distal end, and the extension 41a and flange 43a are not split and have generally solid outer peripheries. The extension 41a is inserted into the receiver 65 by laying the extension 41a in the notch 68 of one of the pieces 29 of the second cylindrical body 24 at the first end 34, similar to the position of the extension 41 in FIG. 4. Then, the other piece 30 of the second cylindrical body 24 is connected to the first piece 29. The connected pieces form the end wall 67, which functions as an engagement surface to engage the flange 43a to retain the second gripper 28a to the body 24 and form the second member 14. Appropriate sonic welding can be used at this location to secure the second gripper 28a to the second member 14 while still allowing for rotation of the second gripper 28a with respect to the second member 14. In another embodiment, the extension 41a of the second gripper 28a may have a different length or dimension, which may be accompanied by changes to the structure of the receiver 65. In a further embodiment, the second gripper 28a may have a narrower width (i.e. thinner upper sides 52) than the second gripper 28 in FIGS. 7-8, which can decrease weight and also increase ease of use. It is understood that the gripper 28a may have gripping teeth connected thereto, such as the teeth 56, 58 of the gripper 28 in FIGS. 7-8.

Figure 12:
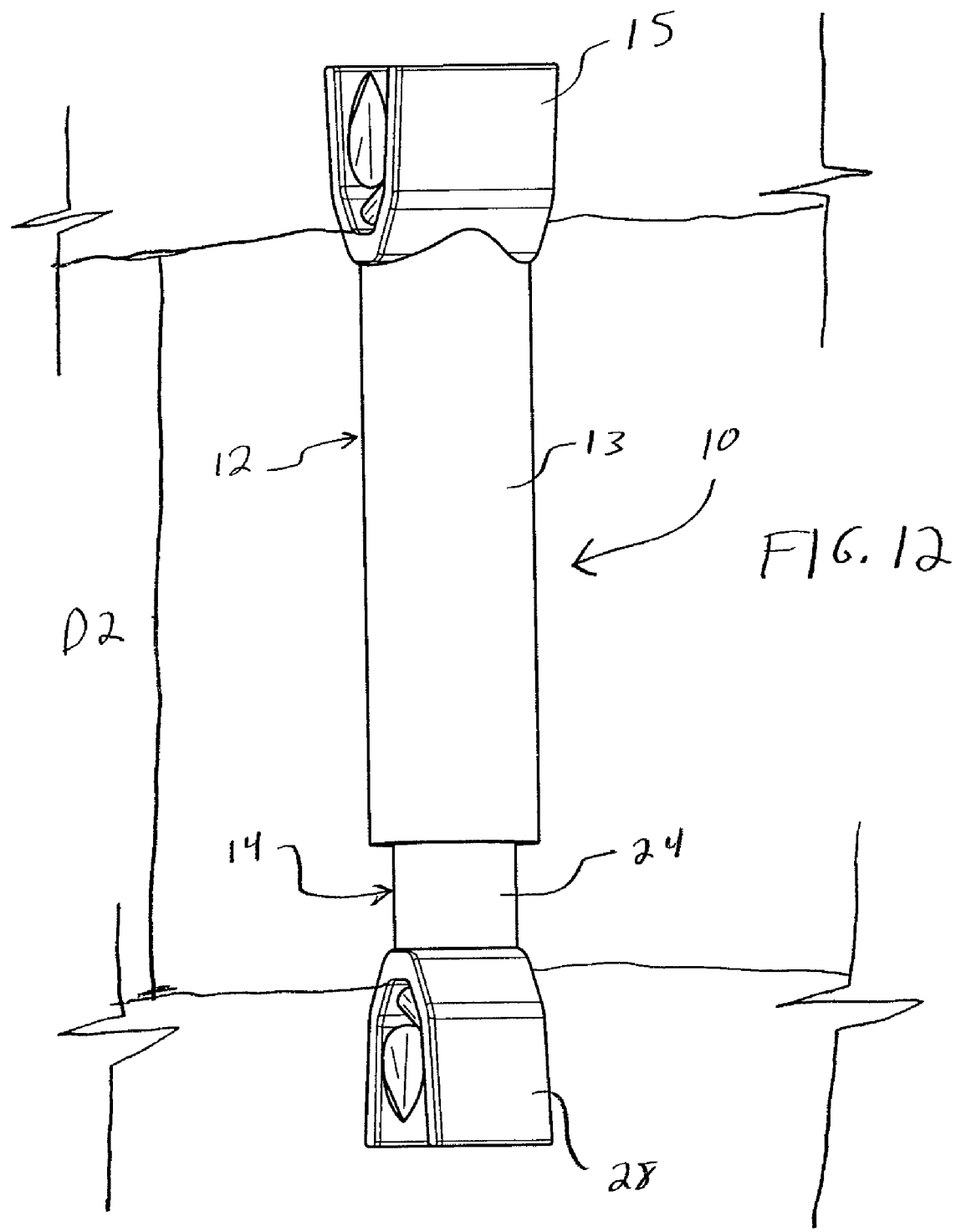
FIG. 12 is a perspective view of the tool of FIGS. 1 and 11 in a second locked position, in use to grip an object.
Figure 13:
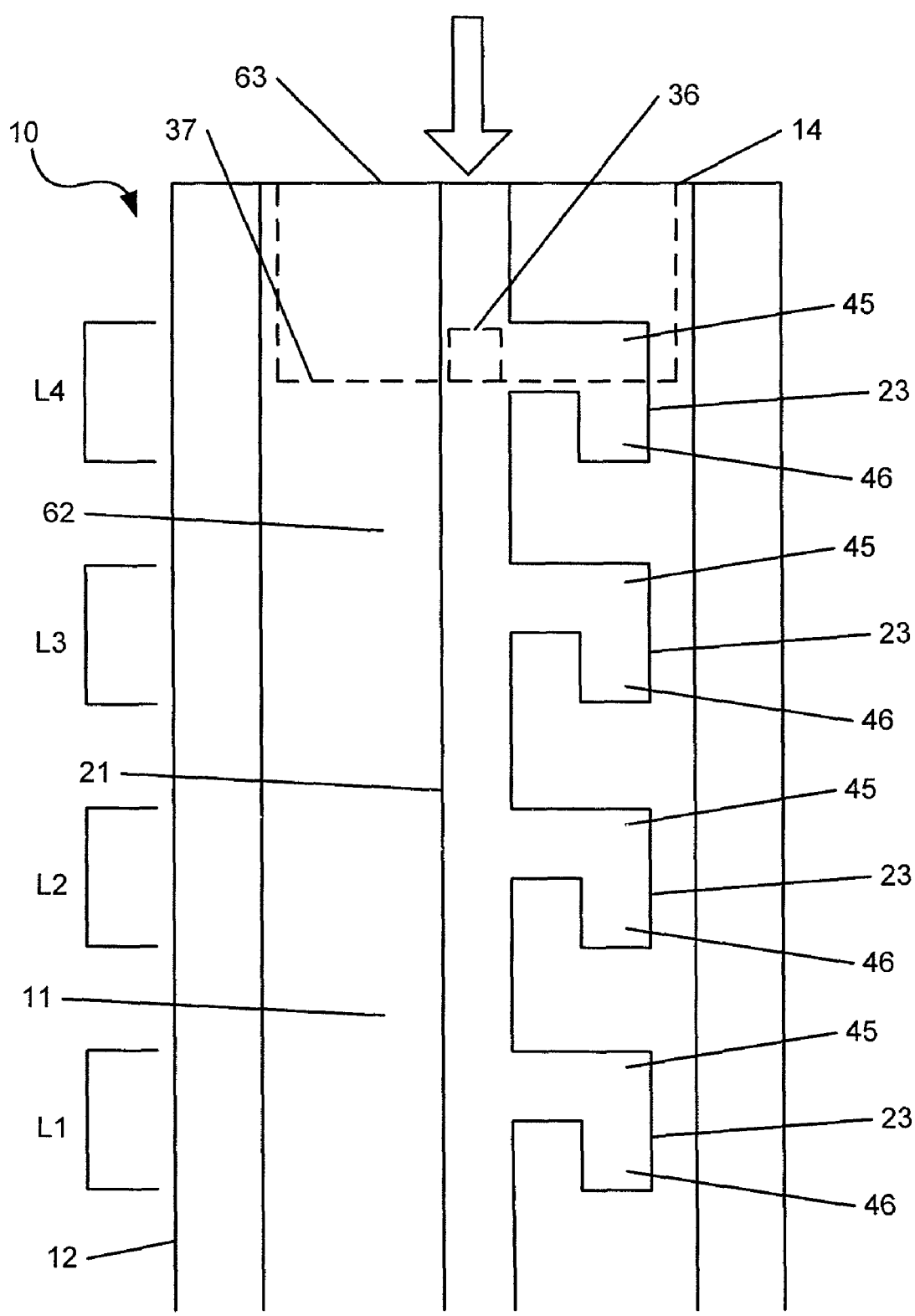
FIG. 13 is a schematic view of portions of the first member and the second member of the tool of FIG. 1, showing the second member in an adjustable position relative to the first member.

As shown in FIGS. 1-4 and 11-17, the first member 12 is removably connected to the second member 14 in telescoping fashion. For clarity purposes, FIG. 4A shows the first member 12 and the second member 14 with each having one piece 30, 16B removed to illustrate the cooperating internal features of the members 12, 14. Cooperation between the members 12,14 is shown schematically in FIGS. 13-17, discussed below, which illustrate the interaction between a single projection 36 of the second member 14 and a single longitudinal groove 21 and corresponding set of locking grooves 23 of the first member 12. The second end 35 of the second cylindrical body 24 of the second member 14 slides inside the hollow interior chamber 62 of the first cylindrical body 13 of the first member 12 through the end opening 63 after aligning the internal longitudinal grooves 21 of the first cylindrical body 13 with each of the projections 36 on the external surface of the second cylindrical body 24. The projections 36 fit inside the internal longitudinal grooves 21 and permit the second cylindrical body 24 to slide into the first cylindrical body 13 in a controlled fashion. FIG. 13 illustrates insertion of the second cylindrical body 24 into the chamber 62 of the first member 12 (see arrow), such that the projection 36 is located within the longitudinal groove 21. When the projection 36 is within the longitudinal groove 21, the second member 14 is axially/telescopically moveable with respect to the first member 12, and is considered to be in an adjustable position. The projection 36 can slide along the longitudinal groove 21 as the second member 14 moves axially. When the projection 36 slides completely to the end of the longitudinal groove 21 proximate the first gripper 15, the tool is in the fully contracted position. It is understood that the opposite projection 36 and corresponding opposite grooves 21, 23 are not shown in FIGS. 13-17, but the relative positioning of the opposite projection 36 and grooves 21, 23 will be approximately the same.

Figure 14:
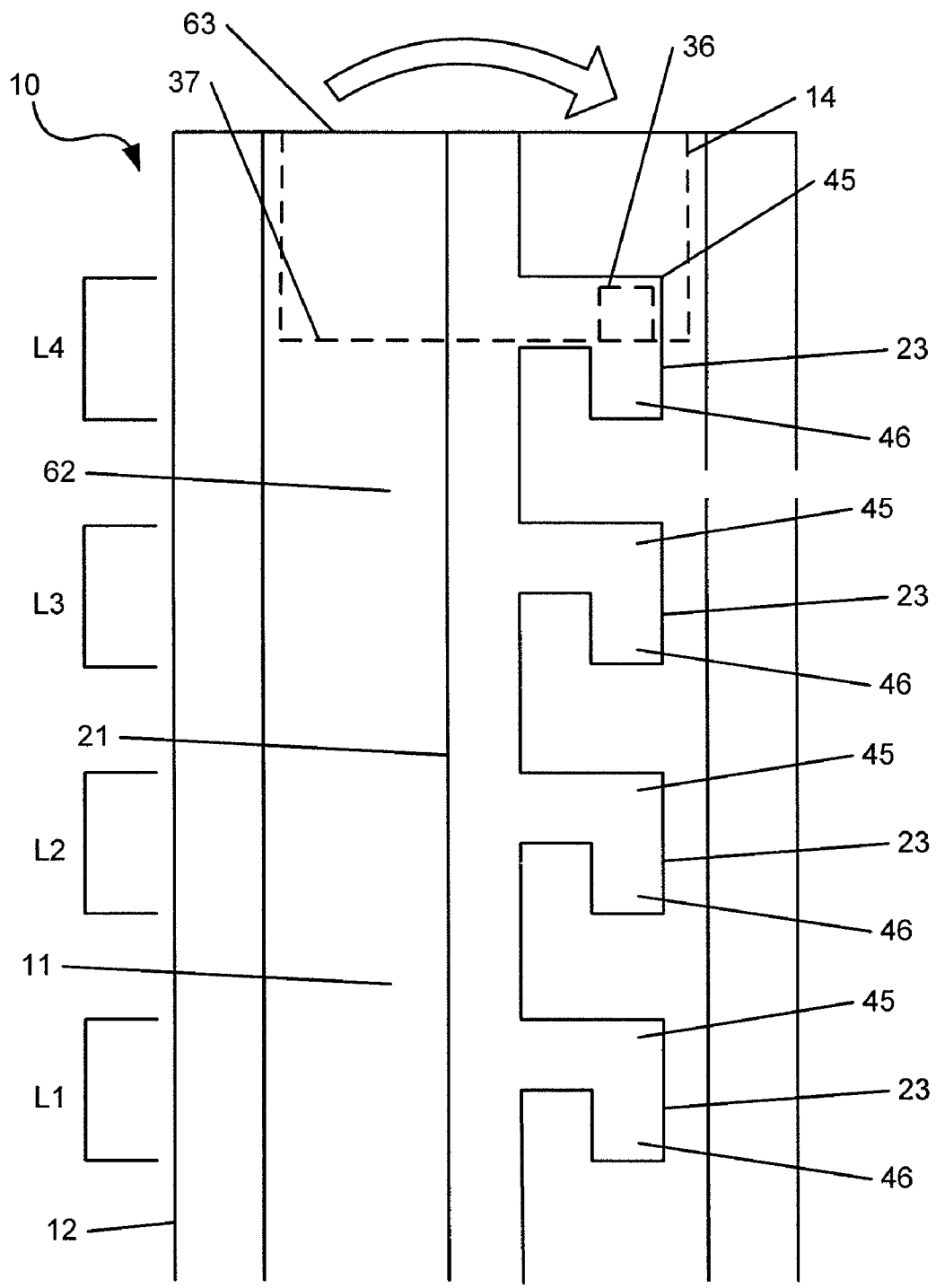
FIG. 14 is a schematic view of the portions of the first member and the second member of the tool of FIGS. 1 and 13, during movement of the second member into a first locked position relative to the first member.
Figure 15:
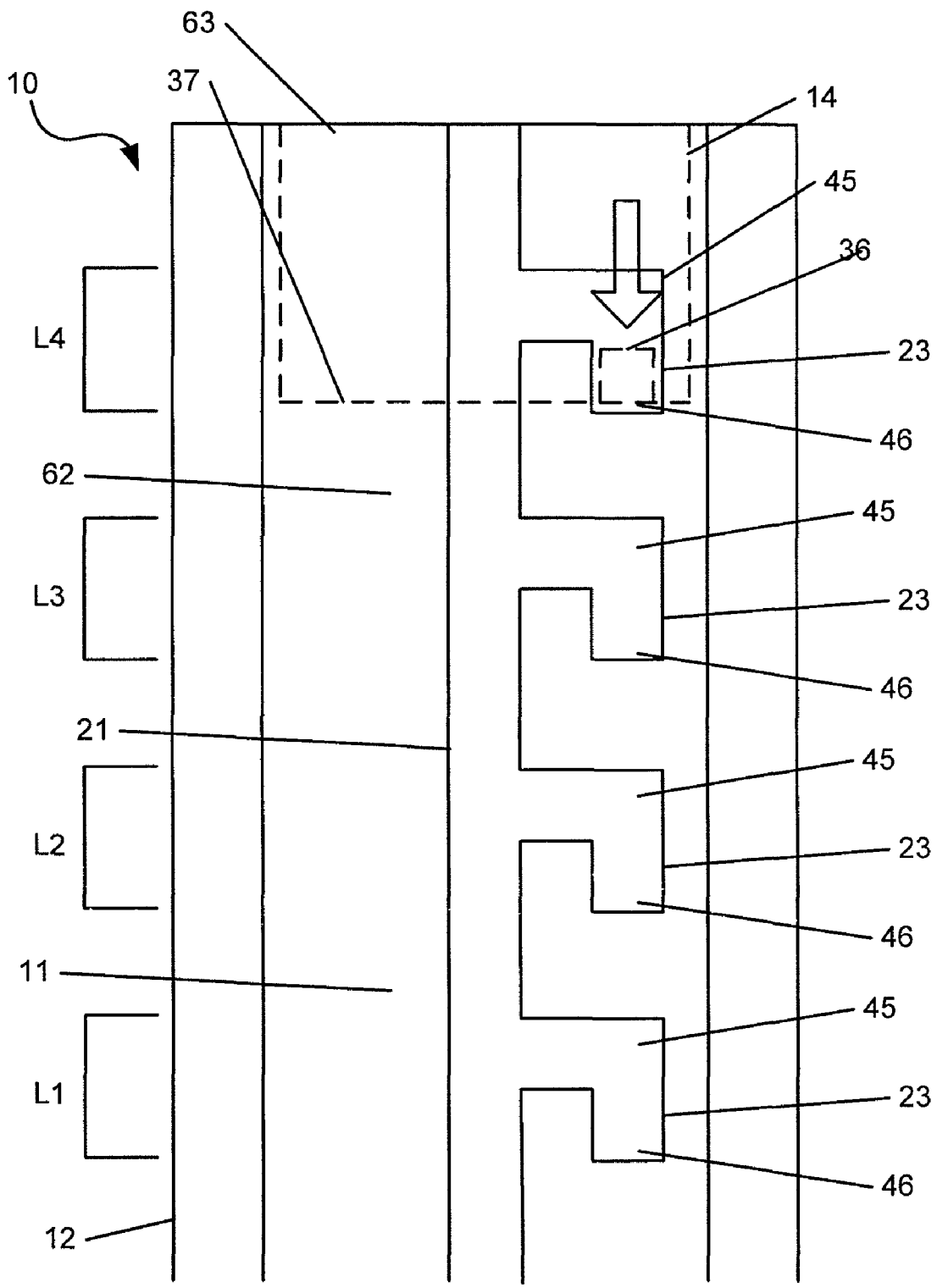
FIG. 15 is a schematic view of the portions of the first member and the second member of the tool of FIGS. 1 and 13-14, showing the second member in the first locked position.
Figure 16:
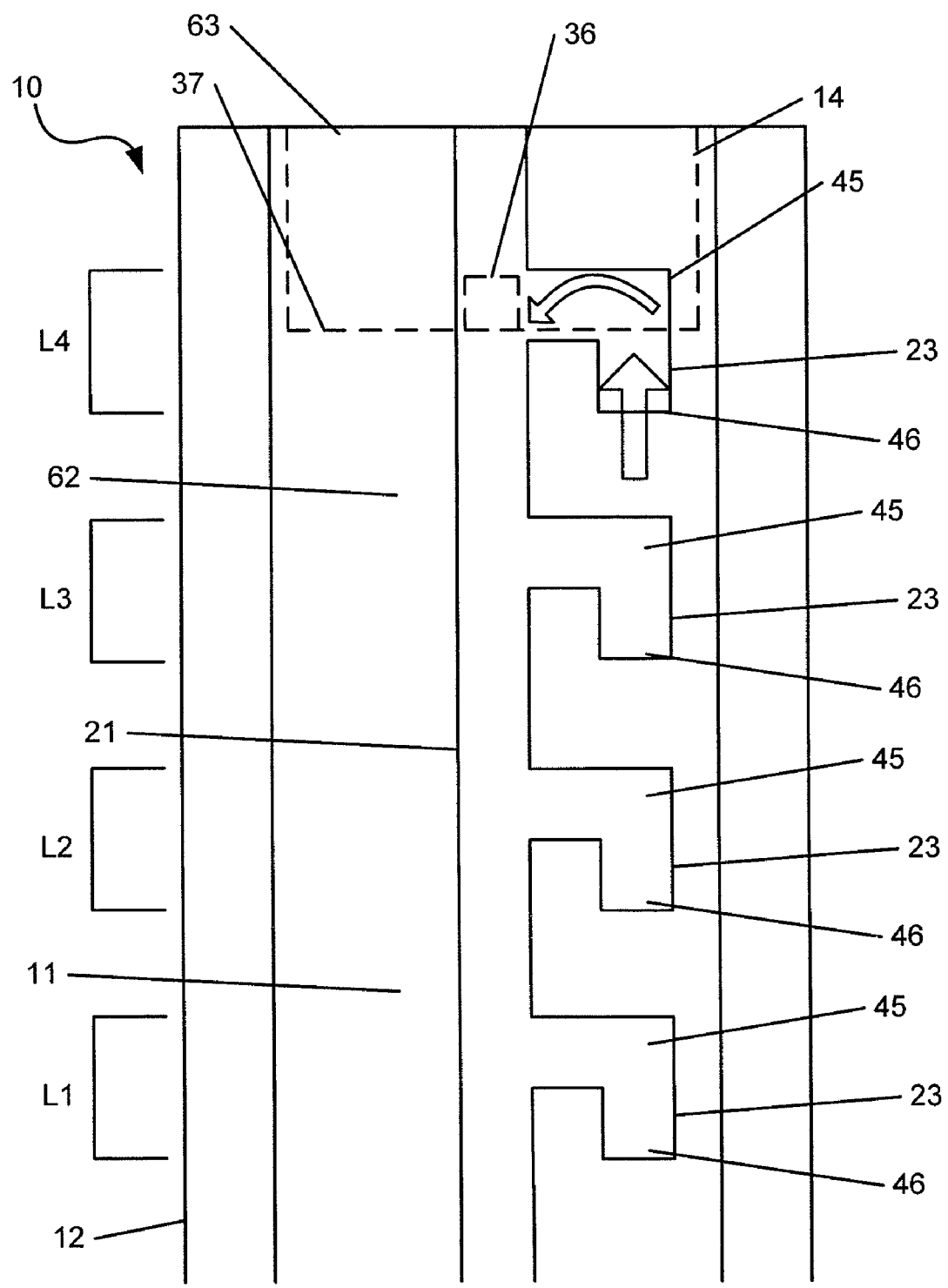
FIG. 16 is a schematic view of the portions of the first member and the second member of the tool of FIGS. 1 and 13-15, showing movement of the second member from the first locked position and back to the adjustable position.
Figure 17:
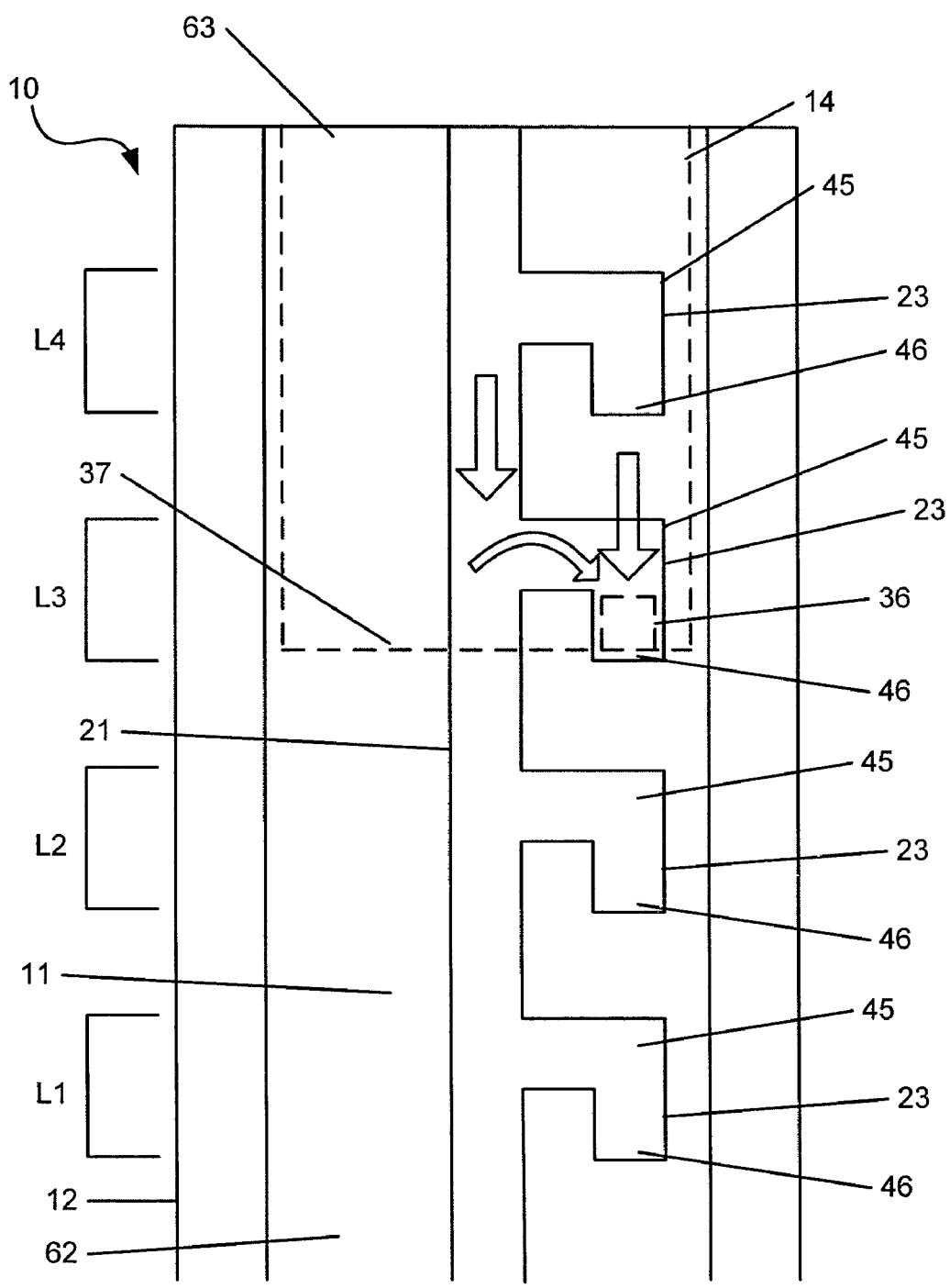
FIG. 17 is a schematic view of the portions of the first member and the second member of the tool of FIGS. 1 and 13-16, showing movement of the second member from the adjustable position to a second locked position relative to the first member.

Once inserted, the second member 14 can be locked to the first member 12 through interaction between the projections 36 and the first set of internal locking grooves 23 within the first cylindrical body 13. The cooperative locking structure between the first and second members allows the second member 14 to be locked into a plurality of locked positions, each of which represent a different degree of extension of the tool 10. Movement to a first locking position from the adjustable position is illustrated in FIGS. 14-15, where the second member 14 is slid generally into the first member 12 until the projections 36 reach the locking grooves 23 of the fourth position L4. Then, the second member 14 is rotated in angular fashion to move the projections 36 through the horizontal portions 45 of the locking grooves 23, as shown by the arrow in FIG. 14, and the second member 14 is moved axially by pushing toward the first gripper 15 to lock the projections 36 into the vertical portions 46 of the locking grooves 23, as shown by the arrow in FIG. 15. Once the second member 14 is locked into position as shown in FIG. 15, with the projections 36 received in the locking grooves 23 of the fourth position L4, the second member 14 is considered to be in the fourth locked position. The members 12, 14 can also be placed into additional locked positions by locking into place by cooperation with the additional locking grooves 23, in positions L1-L3. FIG. 16 illustrates movement the second member 14 from the fourth locked position into the adjustable position, with the arrows indicating the movement of the projection 36. FIG. 17 illustrates movement of the second member from the adjustable position into a third locked position, with the arrows indicating movement of the projection 36 into the locking groove 23 in the third groove position L3. Movement to first and second locking positions can be accomplished by similarly moving the projections 36 into the locking grooves 23 of the first and second groove positions L1, L2, respectively. It is understood that depending on the groove position L1-L4 selected, the members 12, 14 can have a varying degree of extension, and can represent multiple extended positions. Thus, if a greater extended position is desired from L1, the projections 36 can be aligned with the locking grooves 23 at L2-L4 consistent with the description above.

FIGS. 11 and 12 illustrate different degrees of extension of the tool 10, by locking the second member 14 into different locking positions relative to the first member 12. FIG. 11 illustrates the tool 10 when the second member 14 is in the fourth locking position, when the projection 36 is locked in position L4. As shown, the distance D1 between the grippers 15, 28 is fully extended, and the grippers 15, 28 grip objects 69 to separate the objects 69. As will be appreciated, the objects 69 can be portions of a chest cavity of a carcass of a harvested animal, and this extension can be used to expand the chest cavity of the carcass. The position at L4 is the most extended position that the members 12, 14 can be locked. FIG. 12 illustrates the tool 10 when the second member 14 is in the second locking position, when the projection 36 is locked in position L2. As shown, the distance D2 between the grippers 15, 28 is smaller than the distance D1 in the fourth locking position, and the extension of the tool 10 is not as large, so that the grippers 15, 28 separate the objects 69 a smaller distance. It is understood that locking positions L1 and L3 will have further different degrees of extension.

In another embodiment, the first member 12 may have a different number of locking grooves 23, and the locking grooves may have a different shape. For example, in one embodiment, the first member 12 may have two or more locking grooves 23, and in another embodiment, the first member 12 may have only a single locking groove 23 to represent an extended position relative to a fully contracted position. As another example, the locking grooves 23 may be straight, rather than L-shaped, or may take another shape. In a further embodiment, the first and second members 12, 14 may have a different type of complementary locking structure to permit the two members 12, 14 to be locked in a plurality of different positions with respect to each other. For example, the structures may be transposed so that the first member 12 has one or more projections that lock in slots of the second member 14. In still further embodiments, additional types of locking structures may be used.

Figure 9:
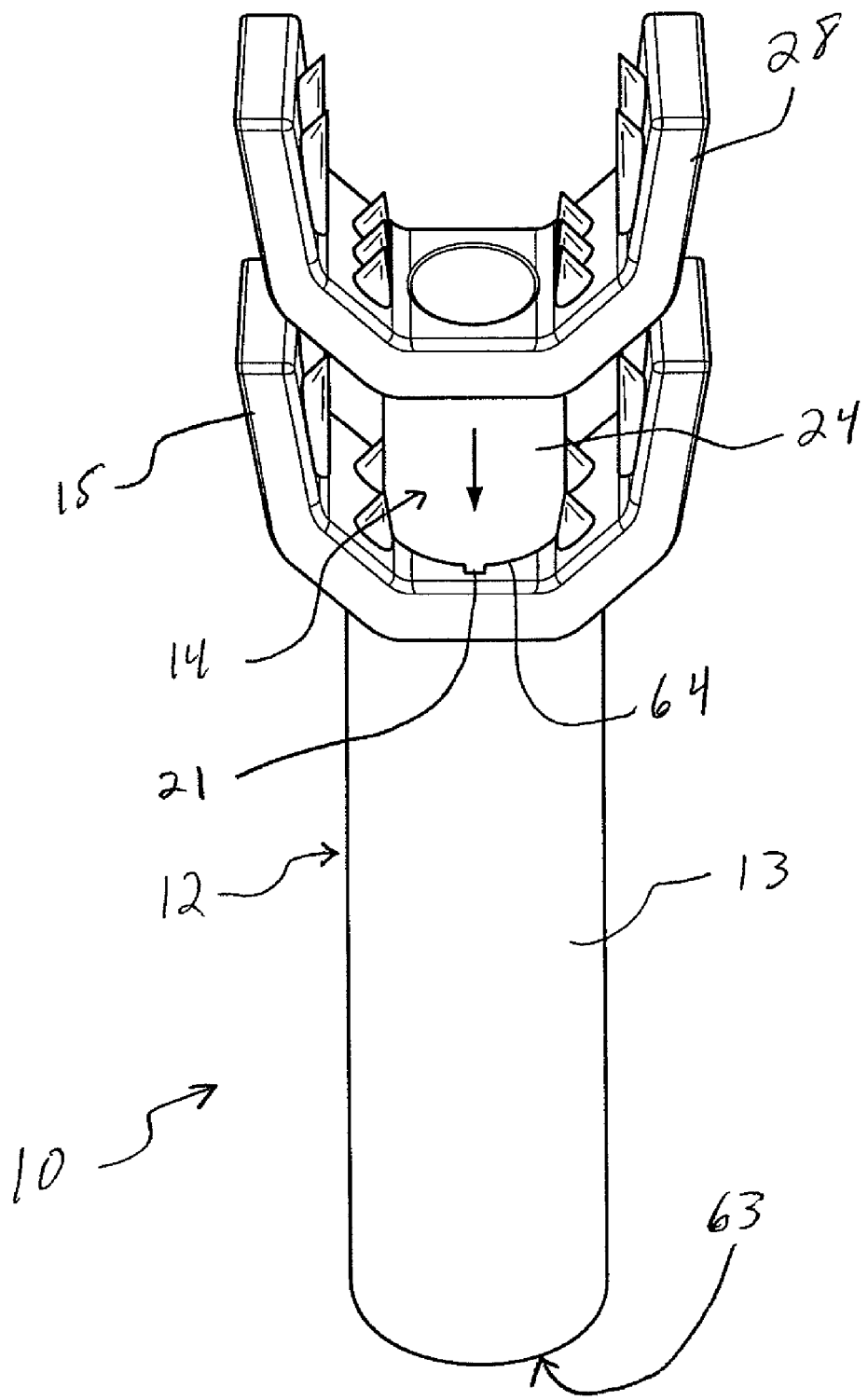
FIG. 9 is perspective view of the tool of FIG. 1 in a field carry position.

In use, the hunter may carry the tool 10 while hunting, such as in a field carry position shown in FIG. 9. In the carry position, the second end 35 of the second member 14 is inserted into the opening 64 of the first member 12 at the first grip 15, rather than the opposite end opening 63 as described above. When the hunter has obtained an animal carcass, such as a deer, and cuts open its chest, the hunter can take out the tool 10 and insert it into the chest cavity in its fully contracted position. Once the tool 10 is inserted into the carcass, the hunter can extend the tool 10 into one of the extended locking positions as to expand the chest cavity as wide as necessary in order to clean the carcass. It is understood that in one embodiment, the tool 10 may have only a single extended locking position, as described above. At the desired extended position, the hunter can lock the tool 10 into place by twisting the second member 14 to fit into the projections 36 into the desired locking grooves 23 in the first member 12, e.g., L1, L2, L3, L4, as described above. The sharp protrusions 22, 25 on the integral first gripper 15 and the sharp protrusions 56,58 on the attached second gripper 28 stick into the carcass to aid in holding the tool 10 in place. The rotatable nature of the attached second gripper 28 on the second member 14 allows the hunter to adjust the second gripper 28 as necessary. When the tool 10 is firmly in place, the hunter is able to cool, clean and harvest the carcass to prepare it for further processing. Once complete, the tool 10 can be returned to its fully contracted position, in which the projections 36 are past the locking grooves at L1, and removed from the carcass. The members 12,14 can also be separated and then one member re-inserted into the other member as shown in FIG. 9, which represents the carry position. The tool 10 can be cleaned at a later time.

The members 12, 14 of the tool 10, including some or all components thereof, can be made from a variety of different materials, including metals, polymers, composites, ceramics, wood, etc., or a combination of such materials. Additionally, the components can be formed using any known method or technique or combination of such techniques, which may depend on the type of material, including without limitation: casting, molding, machining, and other forming methods. In one embodiment, the components of the members 12, 14 are polymer parts produced by injection molding, and may be made from acetal polymers or copolymers, or other polymer materials.

Figure 10:
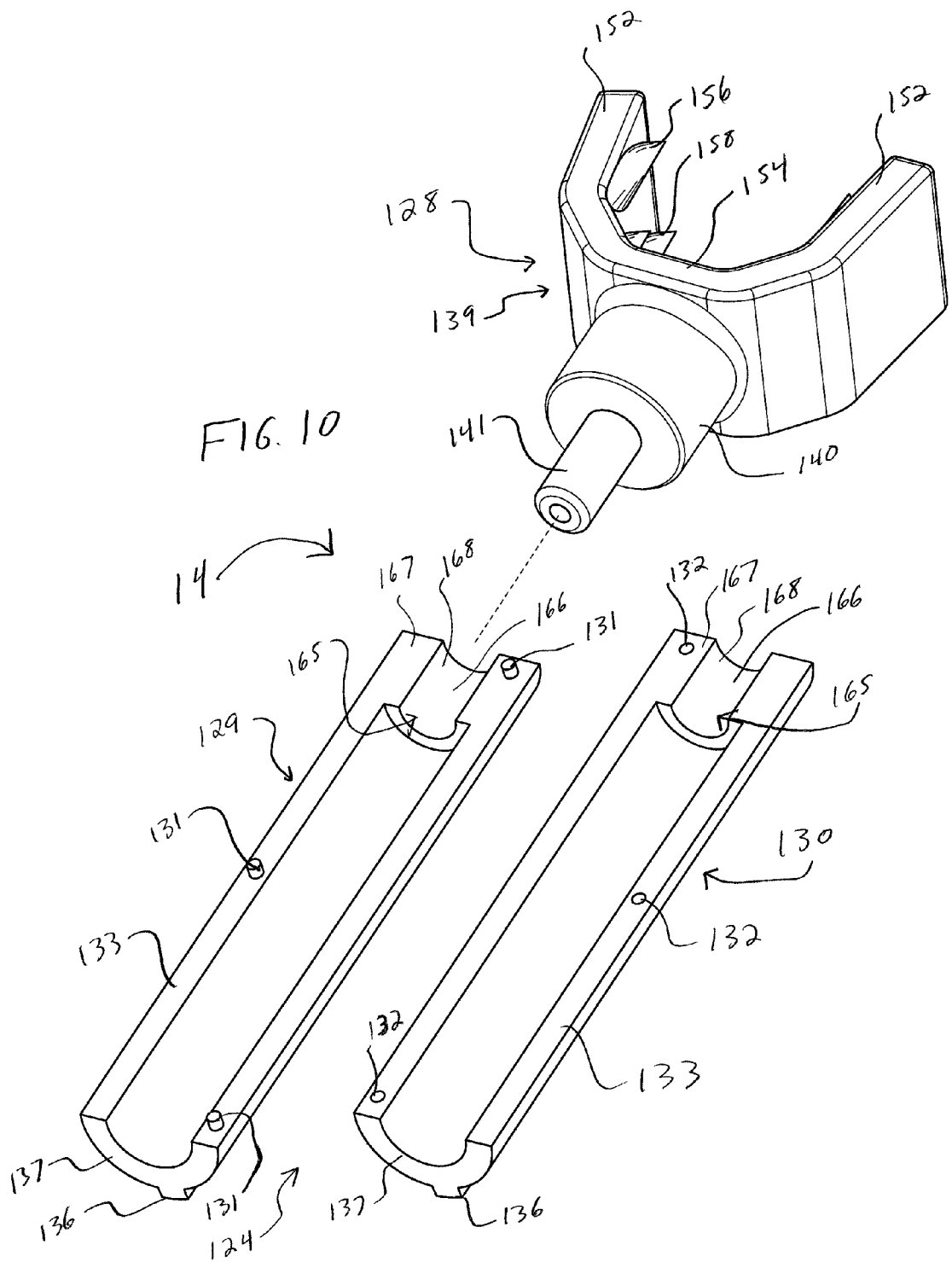
FIG. 10 is an exploded view of another embodiment of a second member of a tool according to the present invention, which is suitable for use with the first member of the tool of FIG. 1.

FIGS. 10 and 11 disclose an additional alternative embodiment of the tool 10 of the present invention. It is understood that other structures and aspects of the tool 10 as described above generally are applicable to the embodiment of FIGS. 10 and 11. Particular differences will be discussed regarding FIGS. 10 and 11 and common or similar structures described above will be designated with similar reference numerals in the "1xx" series.

As can be appreciated from FIG. 10, a second member 114 has a second cylindrical body 124 for attachment to a second gripper 128. The second member 114 will be comprised of three pieces, with the cylindrical body having two pieces 129, 130, and the second gripper 128. The pieces 129, 130 have complementary pins 131 and holes 132 along the edges 133, to allow the pieces 129, 130 to be connected to form the second cylindrical body 124, as similarly described above. The second member 114 also has a receiver 165 formed by a cylindrical opening 166 in an end wall 167 of the second cylindrical body 124, formed by the combination of the two pieces 129, 130, as similarly described above. The cylindrical opening 166 of the receiver 165 will cooperate with the attachable second gripper 128 as described below. Other structures of the piece shown in FIG. 10 to form the second member will be similar to those described above.

As shown in FIG. 10, the alternative second gripper 128 is an attachable piece to the second cylindrical body 124. The second gripper 128 has similar gripper structure to the gripper 28 shown in FIGS. 7-8. As further shown in FIG. 10, the second gripper 128 has an extension in the form of a finger 141 on the bottom of a cylindrical neck portion 140. The finger 141 is configured to be received in the receiver 165 of the second cylindrical body 124 and serves as a means to attach the second gripper 128 to the second cylindrical body 124 to form the second member 114. In an exemplary embodiment, the finger 141 is a simple cylindrical member that extends from the cylindrical neck portion 140. The finger 141 is sized to fit into the cylindrical opening 166 of the receiver 165. Thus, the second gripper 128 is connected to the second member simply by inserting the finger 141 into the cylindrical opening 165. It is understood that the finger 141 can rotate within the cylindrical opening 133, such that the second gripper 128 can rotate 360 degrees with respect to the second member 114. In this embodiment, it is further understood that the second gripper 128 is not more permanently secured to the second member. The second gripper 128 can be separated from the second member by pulling the second gripper 128 from the second member 114 so that the finger 141 is removed from the cylindrical opening 166. In this embodiment, no structure is provided to permanently attach the second gripper 128 to the second cylindrical body 124. It is understood, however, the receiver 165 and the finger 141 could be cooperatively dimensioned to provide an interference fit therebetween while still allowing the finger 141 to be pulled out of the cylindrical opening 166 and also rotated. It is understood that the second member 114 of FIG. 10 can be used with the first member 12 as shown in FIGS. 1-4 and described above.

The tool 10 can be used to cool an animal's chest cavity after cleaning/dressing and during transport, as well as during cleaning/dressing of an animal, to provide greater access to the chest cavity. The tool 10 provides several benefits. First, the tool 10 is lightweight to allow for easy portability. Second, the field carry position shown in FIG. 9 allows the tool to take up less space during transport. Third, the presence of the locking grooves within the first member 12 of the tool 10 provides the hunter the ability to extend and lock the tool at several different lengths (positions L1-L4) to account for the different sizes in chest cavities of animal carcasses. Finally, the rotatable attached second gripper 28 allows the hunter to adjust the tool 10 inside the animal carcass to obtain a sturdier grip. In addition, the tool 10 can be made generally from injected-molded materials providing for easy and efficient manufacture, as well as light weight. The tool 10 can also be easily cleaned for future uses.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof The present examples and embodiments, therefore, are to be considered in all respects as illustrative and not restrictive, and the invention is not to be limited to the details given herein. The terms "first," "second," "top," "bottom," etc., as used herein, are intended for illustrative purposes only and do not limit the embodiments in any way. Additionally, the term "plurality," as used herein, indicates any number greater than one, either disjunctively or conjunctively, as necessary, up to an infinite number. Accordingly, while the specific embodiments have been illustrated and described, numerous modifications come to mind without significantly departing from the spirit of the invention and the scope of protection is only limited by the scope of the accompanying claims.

What is claimed is:

1. A tool comprising:
   a first elongated cylindrical member having opposed first and second ends, the first member comprising a cylindrical wall defining an internal chamber extending from an opening in the second end inwardly at least a portion of a distance from the second end to the first end, the first member having a first gripper attached to the first end; and
   a second elongated member having opposed first and second ends, the second member having a second gripper attached to the first end,
   wherein the second end of the second member is configured to be inserted into the internal chamber of the first member through the opening, such that the second member is moveable axially with respect to the first member within the chamber, and wherein the first and second members have complementary locking structures such that second member is lockable in a plurality of locking positions within the internal chamber, wherein the first gripper and the second gripper are spaced different distances from each other in the plurality of locking positions.

2. The tool of claim 1, wherein the complementary locking structures comprise a longitudinal groove located on an internal surface of the chamber of the first member, with at least a first locking groove in communication with the longitudinal groove and extending transverse to the longitudinal groove on the internal surface of the chamber, the first locking groove being located between the first and second ends of the first member, and a projection located on an outer surface of the second member, wherein the second member is lockable in at least a first locking position relative to the first member, wherein the projection is received in the first locking groove and the first gripper is spaced a first distance from the second gripper in the first position.

3. The tool of claim 1, wherein the complementary locking structures comprise a longitudinal groove located on an internal surface of the chamber of the first member, with at least a first locking groove and a second locking groove in communication with the longitudinal groove and extending transverse to the longitudinal groove on the internal surface of the chamber, the first and second locking grooves being spaced different distances from the first gripper, and a projection located on an outer surface of the second member, wherein the second member is lockable in at least a first locking position and a second locking position relative to the first member, wherein the projection is received in the first locking groove and the first gripper is spaced a first distance from the second gripper in the first position, and the projection is received in the second locking groove and the first gripper is spaced a second distance from the second gripper in the second position.

4. The tool of claim 3, wherein the first and second locking grooves are each formed in a generally L-shaped configuration including a first segment extending transversely from the longitudinal groove and a second segment extending transversely from the first segment, wherein the projection is received in the second segment of the first locking groove in the first position and the projection is received in the second segment of the second locking groove in the second position.

5. The tool of claim 3, wherein the complementary locking structures further comprise a third locking groove and a fourth locking groove in communication with the longitudinal groove and extending transverse to the longitudinal groove on the internal surface of the chamber, the first, second, third, and fourth locking grooves arranged successively along an edge of the longitudinal groove and all being spaced different distances from the first gripper, wherein the second member is further lockable in at least a third position and a fourth position relative to the first member, wherein the projection is received in the third locking groove and the first gripper is spaced a third distance from the second gripper in the third position, and the projection is received in the fourth locking groove and the first gripper is spaced a fourth distance from the second gripper in the fourth position.

6. The tool of claim 3, wherein the complementary locking structures further comprise a second longitudinal groove located on an internal surface of the chamber of the first member opposite the longitudinal groove, with at least a first additional locking groove and a second additional locking groove in communication with the second longitudinal groove and extending transverse to the second longitudinal groove on the internal surface of the chamber, the first and second additional locking grooves being spaced different distances from the first gripper, and a second projection located on the outer surface of the second member opposite the projection, wherein when the second end of the second member is inserted into the internal chamber of the first member, the second projection of the second member is received by the second longitudinal groove, wherein the second projection is received in the first additional locking groove in the first position, and the second projection is received in the second additional locking groove in the second position.

7. The tool of claim 1, wherein the first member is formed of a first partial cylindrical piece and a second partial cylindrical piece joined to each other along a juncture line to form the first member, and wherein the second member is formed of a third partial cylindrical piece and a fourth partial cylindrical piece joined to each other along a juncture line to form the second member.

8. The tool of claim 7, wherein each of the first and second pieces have a partial grip piece integrally connected at an end thereof, wherein the partial grip pieces combine to form the first gripper, such that the first gripper is integrally formed with the first member, and wherein each of the third and fourth pieces have a notch at an end thereof, wherein the notches combine to form a receiver at the first end of the second member, and wherein a portion of the second gripper is received in the receiver to connect the second gripper to the second member, such that the second gripper is rotatable with respect to the second member.

9. The tool of claim 1, wherein the internal chamber of the first member further has a second opening the first end of the first member, such that the internal chamber extends completely through the first member from the opening to the second opening, and wherein the second end of the second member is further configured to be inserted into the second opening to place the tool in a carrying position.

10. A tool comprising:
    a first member comprising a first elongated cylindrical body, a first gripper attached to an end of the first cylindrical body, and an elongated internal chamber extending through the first cylindrical body, wherein the first gripper is integrally formed with the first cylindrical body; and
    a second member comprising a second elongated body having a first end having a receiver and a second end opposite the first end, and a second gripper attached to the first end of the second body, the second gripper having an extension received in the receiver to connect the second gripper to the second body, such that the second gripper is rotatable with respect to the second body, wherein the second end of the second member is configured to be inserted into the internal chamber of the first member, such that the second member is moveable axially with respect to the first member within the internal chamber, and wherein the first and second members have complementary locking structures such that second member is releasably lockable in at least one locking position within the internal chamber.

11. The tool of claim 10, wherein the first member is formed of a first partial cylindrical piece and a second partial cylindrical piece joined to each other along a juncture line to form the first cylindrical body, each of the first and second pieces having a partial grip piece integrally connected at an end thereof, wherein the partial grip pieces combine to form the first gripper integrally formed with the first cylindrical body.

12. The tool of claim 11, wherein the first and second partial cylindrical pieces together have a plurality of complementary protrusions and holes, wherein the protrusions are received within the holes to connect the first piece to the second piece.

13. The tool of claim 10, wherein the second member is formed of a first partial cylindrical piece and a second partial cylindrical piece joined to each other along a juncture line to form the second cylindrical body, and wherein each of the first and second pieces have a notch at an end thereof, wherein the notches combine to form the receiver.

14. The tool of claim 13, wherein the first and second partial cylindrical pieces together have a plurality of complementary protrusions and holes, wherein the protrusions are received within the holes to connect the first piece to the second piece.

15. The tool of claim 10, wherein the receiver has an engagement surface and the extension of the second gripper has a flange that engages the engagement surface to retain the extension within the receiver.

16. The tool of claim 10, wherein the extension of the second gripper comprises a pair of flexible tabs and the receiver has a narrowed opening, wherein when the extension is inserted into the receiver, the tabs flex inwardly to fit into the narrowed opening and expand outwardly to retain the extension within the receiver after passing the narrowed opening.

17. The tool of claim 10, wherein the first and second grippers are each formed in a generally U-shaped configuration with protrusions thereon to assist in gripping an object.

18. A tool comprising:
a first elongated cylindrical member having a first gripper attached to an end thereof, the first member having an internal chamber extending therethrough and a first connecting structure on an internal surface of the chamber;
a second elongated member having a second gripper attached to a first end thereof, a second end configured to be inserted into the internal chamber of the first member, and a second connecting structure on an outer surface of the second member;
wherein when the second end of the second member is inserted into the internal chamber of the first member, the projection of the second member is received by the longitudinal groove such that the second member is moveable axially with respect to the first member,
wherein one of the first and second connecting structures comprises a longitudinal groove with a locking groove in communication with the longitudinal groove and extending transverse to the longitudinal groove,
wherein another of the first and second connecting structures comprises a projection configured to slide within the longitudinal groove when the second end of the second member is inserted into the internal chamber of the first member, and
wherein the second member is lockable in at least one extended locking position relative to the first member, including at least a first position, wherein the projection is received in the locking groove, wherein the first gripper is spaced a first distance from the second gripper in the first position, and the second member is further moveable to a fully contracted position, wherein the first gripper is spaced a second distance from the second gripper in the fully contracted position, the second distance being less than the first distance.

19. The tool of claim 18, wherein the first connecting structure comprises the longitudinal groove with the locking groove in communication with the longitudinal groove and extending transverse to the longitudinal groove, and wherein the second connecting structure comprises the projection.

20. The tool of claim 19, wherein the first connecting structure further comprises a second locking groove in communication with the longitudinal groove and extending transverse to the longitudinal groove, wherein the second member is lockable in a second extended locking position relative to the first member, wherein the projection is received in the second locking groove, wherein the first gripper is spaced a third distance from the second gripper in the second position, the third distance being greater than the first distance.

* * * * *